United States Patent
Bergstrom et al.

(10) Patent No.: US 7,453,355 B2
(45) Date of Patent: *Nov. 18, 2008

(54) METHOD AND SYSTEM FOR CONTROLLING AN ELECTRONIC DEVICE

(75) Inventors: Ami Bergstrom, Sunnyvale, CA (US); Gregory T. Janky, Sammamish, WA (US); Dennis Workman, Morgan Hill, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 541 days.

This patent is subject to a terminal disclaimer.

(21) Appl. No.: 11/176,854

(22) Filed: Jul. 6, 2005

(65) Prior Publication Data

US 2005/0246098 A1 Nov. 3, 2005

Related U.S. Application Data

(63) Continuation-in-part of application No. 10/392,995, filed on Mar. 19, 2003, now Pat. No. 7,050,907, which is a continuation-in-part of application No. 10/222,532, filed on Aug. 15, 2002, now Pat. No. 6,801,853.

(51) Int. Cl.
G08B 1/08 (2006.01)
(52) U.S. Cl. .................................. 340/539.13
(58) Field of Classification Search ............ 340/539.13, 340/988, 426.19, 539.1, 309.16; 455/456.1, 455/456.2, 456.3
See application file for complete search history.

(56) References Cited

U.S. PATENT DOCUMENTS 5,650,770 A 7/1997 Schlager et al.
5,917,405 A 6/1999 Joao
6,046,687 A 4/2000 Janky
6,356,196 B1 3/2002 Wong et al.
6,362,736 B1 3/2002 Gehlot
6,505,049 B1 1/2003 Dorenbosch
6,512,465 B2 1/2003 Flick
6,609,064 B1 8/2003 Dean
6,657,587 B1 12/2003 Mohan
6,658,349 B2 12/2003 Cline
6,700,762 B2 3/2004 Underwood et al.
6,801,853 B2 10/2004 Workman
6,804,602 B2 10/2004 Impson et al.

(Continued)

FOREIGN PATENT DOCUMENTS

| GB | 2373086 | 9/2002 |
|---|---|---|
| WO | WO-03/007261 | 1/2003 |
| WO | WO-2004/017272 | 2/2004 |
| WO | WO-2004017272 | 2/2004 |
| WO | WO-2004/083888 | 9/2004 |
| WO | WO/2005/017846 | 2/2005 |

OTHER PUBLICATIONS

"Highland Man's Invention Success With Dewalt", http://www.heraldextra.com/content/view/195674/4/, (Oct. 8, 2006),3.

Primary Examiner—Phung Nguyen

(57) ABSTRACT

A method and system for controlling an electronic device is described. The method includes programming a device controller with a location and/or time to define a geo-temporal zone according to the location and/or a window of time, and to select a device function that zone. A device state, which includes the current time and the device position, is then monitored. Upon determining that the device state corresponds with the defined geo-temporal zone, the device is controlled to execute the selected function. The function can relate to selectively enabling or disabling some or all of the device capabilities, power management, and others.

45 Claims, 8 Drawing Sheets

U.S. PATENT DOCUMENTS

| | | |
|---|---|---|
| 6,864,789 B2 | 3/2005 | Wolfe |
| 7,050,907 B1 * | 5/2006 | Janky et al. ................. 701/213 |
| 2002/0070856 A1 | 6/2002 | Wolfe |
| 2004/0034470 A1 | 2/2004 | Workman |
| 2005/0030175 A1 * | 2/2005 | Wolfe ................... 340/539.13 |
| 2005/0179541 A1 | 8/2005 | Wolfe |

* cited by examiner

METHOD AND SYSTEM FOR CONTROLLING AN ELECTRONIC DEVICE

RELATED U.S. APPLICATION

The present invention is a Continuation-in-Part of U.S. utility patent application Ser. No. 10/392,995, filed Mar. 19, 2003 now U.S. Pat. No. 7,050,907 by Gregory T. Janky, Dennis Workman and Ami Bergstrom entitled A Method and System for Controlling an Electronic Device, which is a Continuation-in-Part of Ser. No. 10/222,532 U.S. Pat. No. 6,801,853 issued Oct. 5, 2004 and filed Aug. 15, 2002, entitled A Portable Motion-Activated Position Reporting Device by Dennis Workman, both of which are assigned to the assignee of the present invention, both of which are hereby incorporated herein by reference in their entirety.

TECHNICAL FIELD

Embodiments of the present invention are related to a device for determining and reporting the position of a person or object, and for providing control information.

BACKGROUND

Position reporting devices are frequently used to locate and report the position of a person or object. A typical position reporting device combines a navigation system such as a Global Positioning System (GPS) module with a mobile communications system such as a cellular modem to determine the position or geographic location of a person or an asset being tracked and report its position to a tracking facility. Position reporting devices are used in a variety of systems in which timely position information is required such as fleet tracking and asset recovery systems.

Fleet tracking systems allow a user to monitor the position of a vessel or vehicle carrying a position reporting device. For example, the course of a vehicle being tracked can be inferred using successive position fixes sent by the position reporting device. In a similar manner it can be inferred that the vehicle is not moving when successive position fixes report the same position. Fleet tracking systems are commonly used by delivery services for routing and dispatching of vehicles. Asset recovery systems report the position of stolen or missing property (e.g., a stolen car) to a service provider or to the police in order to facilitate recovering the property.

However, many potential users find the cost of position reporting devices prohibitive compared to the value of the asset being tracked. Many position reporting devices have a manufacturing cost in the range of $200-$300 and a market price in the range of $500-$600. Thus, the use of position reporting devices has typically been limited to high value items such as cars or other vehicles.

Another drawback associated with position reporting devices is the amount of power they consume. While battery powered position reporting devices do exist, the amount of power they consume when turned on necessitates frequent battery changes in order to continue operating. This makes using position reporting devices inconvenient to some users in that they require an excessive amount of maintenance to continue operating.

Recently, concerns have been communicated regarding the operation of various electronic devices in certain environments. For example, airlines request that passengers refrain from using cellular telephones and laptop computers during takeoffs and landings because they can cause electromagnetic interference that can impair the operation of navigational and other instrumentation systems aboard airplanes. Since July of 2001, the Pentagon (e.g., the U.S. Department of Defense) has had a moratorium on the construction of additional wireless communications networks, and it bars connections to classified networks or computers using devices that are not explicitly approved by the Department of Defense. This is to prevent the unintentional compromise of secure data and includes personal wireless devices such as pagers, Personal Digital Assistants (PDAs), and wireless E-mail devices. As another example, many public facilities such as theaters and restaurants now request that their patrons turn off their wireless devices (e.g., cellular telephones and pagers) while on their premises. The operability of portable electronic devices and other electrical devices may thus relate to space and time, such as facing constraint and/or restriction relating to time and space.

SUMMARY

Accordingly, a need exists for a low-cost portable position determining and/or reporting device which is small enough to be easily concealed upon an asset which is being tracked. While meeting the above need, a further need exists for a method for reducing the power consumption of the above stated device. Additionally, while meeting the above stated needs, it would be advantageous to provide a device which can trigger another electrical device to perform a particular task upon entering or leaving a designated geo-temporal zone, which can be defined on the basis of relation to a geographic location and a time period.

A method and system for controlling an electronic device is disclosed. The method includes programming a device controller with the location to define a geo-temporal zone according to a location and/or a window of time and to select a device function for that zone. A device state, which includes the current time and the device position is then monitored. Upon determining that the device state corresponds with the defined geo-temporal zone, the device is controlled to execute the selected function. The function can relate to selectively enabling or disabling some or all of the device capabilities, power management, and others.

In one embodiment, a controller is coupled with a position determining component, a wireless communications component, a motion detecting component and a time sensitive element. In one embodiment, the motion detecting component detects movement of the electronic device and generates a signal to the controller indicating the movement. The controller, in response to the signal, activates the position determining and/or reporting device to determine the geographic location of the electronic device and the current time. In one embodiment, the controller compares the geographic location of the electronic device, or the current time and geographic location of the device with a pre-definable geo-temporal zone and generates a command for controlling the electronic device based upon the comparison.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description are not drawn to scale.

DETAILED DESCRIPTION

Figure 1:
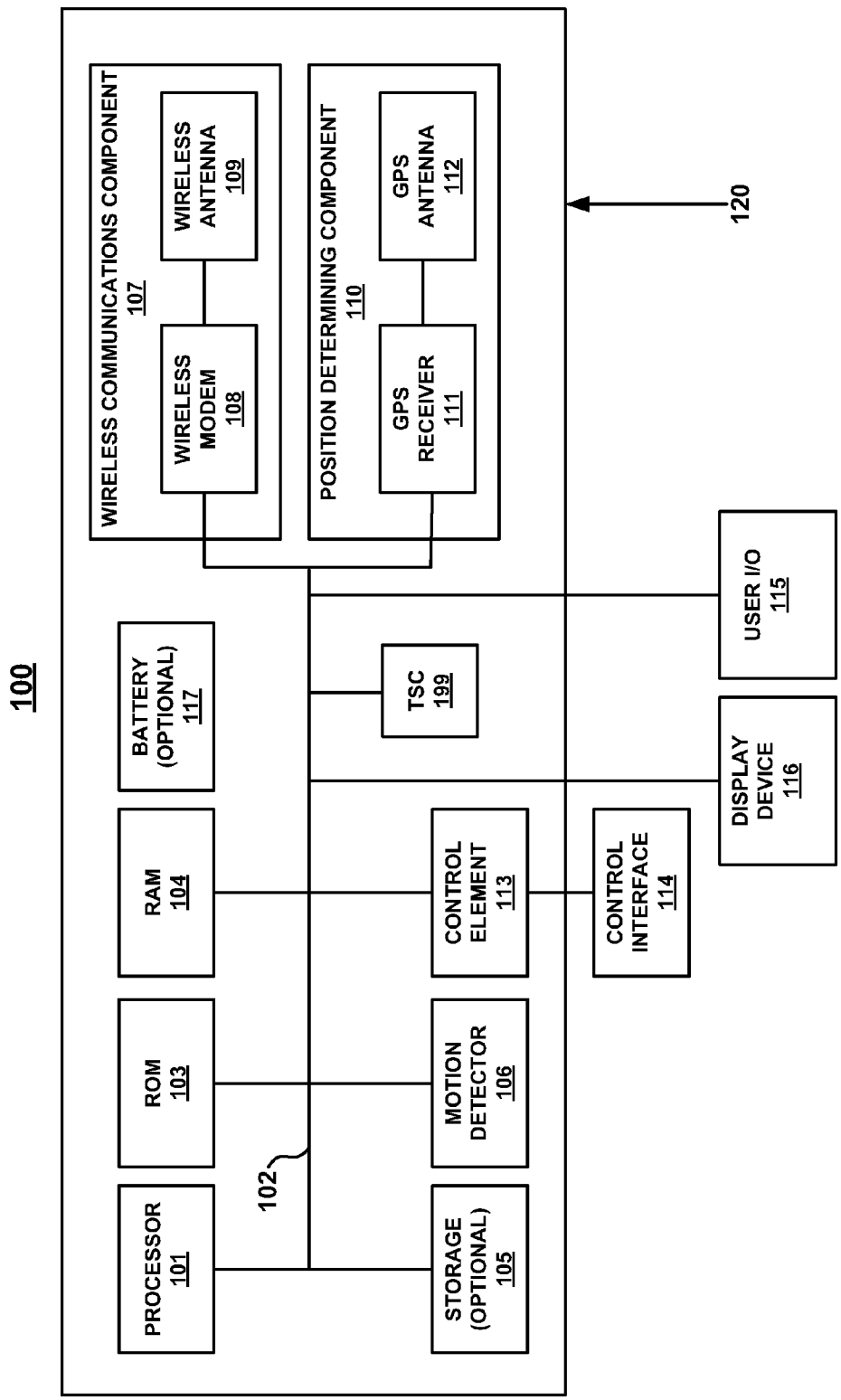
FIG. 1 depicts an exemplary initiating component, according to an embodiment of the present invention.

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Embodiments of the present invention pertain to a method and system for controlling an electronic device. Embodiments of the present invention may be used to monitor the position of an electronic device and to generate commands for causing the device to automatically perform a designated action based upon its geographic location. Embodiments of the present invention can also be used to detect and report unauthorized movement of the electronic device and to assist in recovering it when unauthorized movement occurs.

Embodiments of the present invention comprise an initiating component disposed in an electronic device. The initiating component utilizes a motion detecting component to detect movement of the electronic device and sends a signal to a controller. In response to receiving this signal, the controller ascertains the current time and initiates a position determining component to determine the geographic location of the electronic device. This extends the battery life of the electronic device because the initiating component draws a minimal amount of power until movement of the device is detected. In one embodiment, the geographic location is compared with the coordinates of pre-defined zones. In another embodiment, the time and geographic location is compared with the temporal and spatial coordinates of a pre-defined zone. Based upon the zone in which the electronic device is present, e.g., spatially or spatially and temporally, the controller generates a command for causing the electronic device to perform a specific action.

Embodiments of the present invention utilize a geo-fencing system in which a set of position coordinates is provided which defines a pre-defined zone. In embodiments of the present invention, upon entering or leaving a pre-defined zone, a command is generated for causing the electronic device to perform a particular task. For example, the present invention can be configured to automatically shut down the electronic device when a particular zone is entered and to automatically activate the electronic device when that zone is left. In another embodiment, the position coordinates define a zone within which the asset can be moved without triggering an alarm. When the electronic device is moved outside of that zone, it sounds an audible alarm until deactivated. Alternatively, a wireless message can be sent to a monitoring service that notifies the owner of the device and/or law enforcement agencies in order to facilitate recovering the electronic device.

Embodiments of the present invention can be used to cause an electronic device to perform a particular task upon entering or leaving a designated geo-temporal zone. For example, the present invention can be used to automatically inactivate the electronic device (e.g., a cellular telephone) when it is brought into a restricted area or into that area within a restricted time period. This may include theaters, airports, hospitals, gas stations, or other areas where operating the electronic device may cause, for example, unwanted electromagnetic interference with other equipment in the area. A user can designate these areas to reduce the possibility of the user forgetting to shut down the device. In another embodiment, the user can accept a pre-packaged list of such exclusion zones for automatic implementation of this shut-off feature.

Similarly, the present invention can be used to cause an electronic device to perform a particular task when it is moved outside of a designated geo-temporal zone. Thus, when a user leaves a theater, hospital, or airport, the present invention can cause the electronic device to be automatically activated. As an example, a user's cellular telephone can be activated when the user moves outside of a theater.

In another embodiment, the present invention can be used as a theft deterrent. For example, if a laptop computer is moved outside of a zone designated by the owner, the present invention may cause the computer to sound an alarm, send a notification to a security service provider, or contact the owner of the computer (e.g., by contacting the owner via a pager, cellular phone, or E-mail message). In another instance, a money box implementing an embodiment of the present invention can be controlled to open only within a pre-designated geographical zone within a programmable window of time.

Therefore, a portable electronic device is controlled according to its presence within a pre-definable zone of space and/or time and space. Thus, the electronic device is controlled upon entry within a pre-defined geo-temporal zone, which can be a zone defined in terms of geographic location and/or of time and geographic location. This capability allows the device to be selectively enabled or disabled according to its relation with the geo-temporal zone, to perform certain power management functions, and to operate in a designated mode on the basis of its spatial and/or space-time presence in the geo-temporal zone.

Exemplary Initiating Component

FIG. 1 depicts an exemplary initiating component 100, according to an embodiment of the present invention. Initiating component 100 comprises a processor 101 coupled with an address/data bus 102. Processor 101 is for processing digital information and instructions and bus 102 is for conveying digital information between the various components of initiating component 100. Also coupled with bus 102 is a non-volatile read only memory (ROM) 103 for storing information and instructions of a more permanent nature, and a random access memory (RAM) 104 for storing the digital information and instructions of a more volatile nature. In addition, initiating component 100 may optionally include a data storage device 105 for storing vast amounts of data. In embodiments of the present invention, data storage device 105 may comprise a removable storage medium such as a smart card or an optical data storage device. Alternatively, data storage device 105 may comprise a programmable data storage device such as a flash memory device to facilitate quickly updating data. It should be noted that instructions for processor 101 as well as position coordinates which define a pre-defined zone, previously determined geographic locations of initiating component 100, previously sampled GPS signals, and configuration data for determining what action should be initiated depending upon the current time and/or location of initiating component 100, can be stored either in volatile memory 104, data storage device 105, or in an external storage device (not shown).

Initiating component 100 also comprises a time sensitive element (e.g., component, device, etc.) 199. In one embodiment, time sensitive element 199 is disposed within processor 101. For instance, in one embodiment, time sensitive element 199 comprises the real time clock with which processor 101 operates. In one embodiment, time sensitive element 199 comprises a device, such as a real time clock, a crystal oscillator, etc., coupled to processor 101 with bus 102, which can function in conjunction with or independently of a clock or processor 101. In one embodiment, time sensitive element 199 is operable with wireless communications component 107, I/O 115, and/or position determining component 110 for time checking, updating, synchronizing, adjusting, etc., with a source of reliable time signals such as may be associated with and/or promulgated, e.g., wirelessly, telephonically, etc., by a geo-positioning entity, a network or communication entity, a standard time source such as is maintained (e.g., operated, promulgated, etc.) by the National Institute for Standards and Technology (NIST) of the U.S. Department of Commerce or another government, scientific, commercial or other time reporting entity, and In one embodiment, initiating component 100 is controlled according to a time determined with time sensitive element 199.

Initiating component 100 further comprises a motion detector 106 coupled with bus 102 for detecting changes in the motion state of initiating component 100. In one embodiment, motion detector 106 detects the vibration associated with the movement of initiating component 100 and indicates this movement to processor 101 when changes in the vibration of initiating component 100 are detected. In other embodiments of the present invention, motion detector 106 may be a magneto-restrictive motion detector (MRMD), an acceleration sensor (e.g., accelerometer), a tilt sensor, a rotation sensor, a gyroscope, etc. However, while the present embodiment recites these particular implementations of motion detector 106, the present invention is well suited to utilize a variety of devices for detecting movement of initiating component 100 and for indicating this movement to processor 101. A MRMD used in one implementation comprises a device similar to those provided by Honeywell, Inc., a corporation in Morristown, N.J. MRMDs typically operate according to principles explained in a paper entitled "A New Perspective on Magnetic Field Sensing," by T. Bratland, M. J. Caruso, C. H. Smith and R. Schneider (1998), which is available from Honeywell, Inc., and which is incorporated herein in its entirety by reference.

In accordance with embodiments of the present invention, motion detector 106 detects when initiating component 100 transitions from a substantially stationary state to a moving state. Motion detector 106 can also detect when initiating component 100 transitions from a moving state to a substantially stationary state and/or changes in the rate of movement of initiating component 100. Thus, in embodiments of the present invention, motion detector 106 detects changes in the state of motion of initiating component 100 such as starting or stopping of motion, as well as acceleration/deceleration and generates an interrupt to processor 101. In response to these changes in motion, an interrupt is generated by motion detector 106. In response to an interrupt from motion detector 106, processor 101 changes the operating state of initiating component 100 from an idle operating state, in which a few components of initiating component 100 (e.g., wireless communications component 107 and position determining component 110) draw a minimal amount of power, to an active operating state in which the initiating component 100 draws additional power.

A wireless communications component 107, comprising a wireless modem 108 and a wireless antenna 109, is coupled with bus 102. A position determining component 110, comprising a GPS receiver 111 and a GPS antenna 112, is coupled with bus 102.

Wireless communications component 107 is for transmitting and receiving wireless messages (e.g., data and/or commands). In one embodiment, wireless communications component 107 is comprised of a cellular wireless antenna 109 and a cellular wireless modem 108. In one embodiment, initiating component 100 sends and receives messages using the Short Message Service (SMS). However, the present invention is well suited to utilize other message formats as well. In other embodiments of the present invention, wireless communications component 107 may comprise a Bluetooth wireless communications device, or another wireless communications device such as a Wi-Fi transceiver. Wi-Fi transceivers are often used to create local area networks between a portable computer and an Internet access point in public areas such as airports, coffee shops, libraries, and the like.

Position determining system 110 is for determining the location initiating component 100. In embodiments of the present invention, position determining component 110 comprises a GPS antenna 112 and a GPS receiver 111. However, while the present embodiment specifically recites a GPS position determining system, embodiments of the present invention are well suited to utilize a variety of terrestrial-based and satellite-based position determining systems as well.

A control element 113 is coupled with bus 102 and is for generating a control signal via control interface 114 depending upon the current time and/or location of initiating component 100.

Devices which are optionally coupled to initiating component 100 include a display device 116 for displaying information to a user. Display device 116 may be a liquid crystal device, cathode ray tube, a field emission display, or other display device suitable for creating graphic images and alphanumeric characters recognizable to a user. A user input device 115 may also be coupled with bus 102 in embodiments of the present invention. In embodiments of the present invention, user input device 115 may comprise a keyboard, and a cursor control device (e.g., a mouse, trackball, light pen, touch pad, joystick, etc.), for inputting data, selections, updates, and for controlling initiating component 100. Initiating component 100 may optionally include a battery 117 for providing power for initiating component 100. While the present embodiment recites a battery powered device, the present invention is well suited to be electrically coupled with the device it is controlling and for drawing power from that device. For example, if initiating component 100 is disposed within a laptop computer, it may draw power from the laptop computer itself.

In embodiments of the present invention, components of initiating component 100 may be disposed upon a printed circuit board 120 such as a Personal Computer Memory Card Industry Association (PCMCIA) card, etc. This allows embodiments of the present invention to be used in a variety of electronic devices such as cellular telephones, laptop computers, PDAs, and the like. However, in other implementations of the present invention, initiating component 100 may be a stand alone device that is used to control another device. For example, initiating component 100 may be installed in an automobile and used to initiate an action depending upon the location of the automobile. Thus, the components comprising initiating component 100 may be disposed within a housing.

It is appreciated that some of the components recited in the above discussion may be omitted in embodiments of the present invention. For example, when initiating component 100 is disposed within a laptop computer, or a PDA, display device 116 and user input device 115 may be redundant and therefore omitted to reduce the cost of initiating component 100. In other implementations of the present invention, initiating component 100 may be disposed in an electronic device already having a wireless communications capability (e.g., a cellular telephone). Thus, wireless communications component 107 may be omitted in embodiments of the present invention in order to reduce the cost of initiating component 100. Additionally, control element 113 may be omitted in embodiments of the present invention. For example, a control signal may be generated by processor 101 via control interface 114 for controlling an electronic device.

In embodiments of the present invention, when motion detector 106 detects movement of initiating component 100, it generates an interrupt signal to processor 101. In response to the interrupt signal, processor 101 activates other components of initiating component 100 such as wireless communications component 107 and/or position determining component 110. The geographic location of initiating component 100 is then determined using position determining component 110. Processor 101 compares the present geographic location with geographic coordinates that define a pre-defined zone. The coordinates of the pre-defined zone may reside in RAM 104 or in storage device 105. Based upon this comparison, processor 101 causes control element 113 to generate a command for controlling the electronic device in which initiating component 100 resides.

Alternatively, processor 101 may generate the command for controlling the electronic device itself. For example, initiating component 100 may be configured to generate a command causing the electronic device to become deactivated when it enters a restricted zone such as a theater, or the gangway leading from the departure lounge to the aircraft while boarding. Since the unit is programmed to operate autonomously to perform this shutdown function, it will work for items which are stored in luggage as well, performing another valuable service by ceasing battery drain while located in an unusable space. When the electronic device moves outside of the restricted zone, processor 101 may generate a signal causing the electronic device to become activated again. This is a great convenience to users who may forget to turn off their electronic devices when they enter a restricted area or to turn them back on when they leave the restricted area.

It should be appreciated that a full forced power shutdown exemplifies one type of deactivation and that re-energizing after such a power down exemplifies one type of reactivation. Embodiments of the present invention are well suited to deactivate and/or reactivate the electronic device in other ways, e.g., short of a full power-down event and/or re-energizing thereafter. For instance, the device can be deactivated without a full power down, as where wireless transmissions from the device may be disabled while within a geo-temporally restricted zone, yet remain capable of performing another function. Similarly, in this instance, reactivating the device after such a deactivation could simply comprise restoring wireless transmission capability to the device upon leaving the geo-temporal zone wherein such transmissions are forbidden (e.g., to be secured, forced transmission squelched, etc.).

In embodiments of the present invention, storage device 105 stores a database of geographic coordinates which can define a plurality of pre-defined zones and associated commands that are to be generated by processor 101 depending upon whether the electronic device is inside of or outside of a pre-defined zone. Additionally, the geographic coordinates can define a route or plurality of routes. If the electronic device deviates from a specified route, processor 101 can generate commands to the electronic device. For example, processor 101 can cause the electronic device to sound an alarm or other noise, vibration, light emission, and/or production, emission, and/or presentation of any other human-detectable, human sensory sensitive, etc. stimulus, attention elicitor, irritant, or the like, for instance, as a theft deterrent if the device is removed from a specified zone. Alternatively, processor 101 can initiate sending a message via wireless communications component 107 notifying the owner of the electronic device that it has left a specified zone, or notify police or other agencies. Additionally, processor 101 can initiate continuous location updates to assist in recovering the electronic device if it has been stolen.

The geographic location or route information used to determine what action should be initiated by the present invention may further be modified using temporal information. For example, if initiating component 100 is disposed within an automobile, time parameters may be used in conjunction with location parameters to determine what action should be initiated by the present invention. Thus, users could designate their typical route used when commuting to work and the hours when the automobile is permitted to be within that route. If the automobile is stolen, even if it is at a geographic location within the pre-defined boundaries of the commuting route, initiating component 100 may generate a control signal because it is at that location at the wrong time of the day. Initiating component 100 may initiate generating a message conveying that the automobile has been stolen as described above, or may in some manner disable the automobile to prevent further movement of the automobile.

For example, initiating component 100 may be coupled with the ignition system or the computer of the automobile. After determining that unauthorized movement of the automobile has occurred, initiating component 100 may generate a control signal to disable the automobile's engine the next time motion detector 106 determines that the automobile has stopped moving. This is so that initiating component 100 does not disable the automobile, for example, in the middle of a highway which may endanger other commuters. An initiating device lacking the motion detector of the present invention would not be able to perform in this manner and may provide a less flexible or responsive solution to some situations addressed by the present invention.

Utilizing a motion detector with a position determining device is seemingly counter-intuitive or at least redundant in the current position reporting environment which relies upon successive position fixes to imply movement of the reporting device. For example, receiving a series of position reports which come from different locations implies that the initiating device is in motion. Alternatively, receiving a series of position reports which come from the same location implies that the initiating device is stationary. Therefore, it was considered redundant to incorporate a motion-detecting component into a device which already had an implied function of detecting motion.

However, providing initiating component 100 with motion detector 106 is advantageous because it reduces the amount of time that components of initiating component 100 are activated in order to determine a geographic location and thus extends the battery life of the electronic device with which initiating component 100 is coupled. In prior art initiating devices, determining whether the device was moving or stationary depended upon determining and comparing successive position fixes. If successive position fixes were from the same location, it was inferred that the device was stationary. If successive position fixes were from different locations, it was inferred that the device was in motion.

These position fixes had to be provided at a regular interval in order to provide timely notification that the device was being moved. However, providing successive position fixes for a device which has not moved is an unnecessary drain of battery power, especially when the device remains stationary for extended periods of time. This in turn is burdensome to users of the device who are required to frequently replace the batteries of the electronic device in which initiating component 100 is disposed or to couple the electronic device to an external power source.

In embodiments of the present invention, storage device 105 or volatile memory 104, etc. may also store previously determined geographic positions of initiating component 100 and/or previously sampled GPS signals as an aid to signal acquisition in environments where a clear path to the satellites is either partially or totally obscured, as inside a building. In some GPS implementations, previously sampled GPS signals are used to more rapidly determine the current location of a GPS receiver and improve its sensitivity during low signal-to-noise ratio conditions. One such system is described in U.S. Pat. No. 6,289,041 titled Fast Acquisition, High Sensitivity GPS Receiver by Norman F. Krasner, assigned to SnapTrack Inc. of San Jose, Calif., and incorporated by reference herein in its entirety. In this patent, Krasner describes a system in which a currently sampled GPS signal is accumulated with a previously sampled GPS signal in order to improve the sensitivity and acquisition speed of the receiver. However, the present invention is well suited to utilize a variety of implementations for improving the sensitivity of a GPS receiver during low signal-to-noise ratio conditions.

While embodiments of the present invention can be utilized as a stand alone device, other embodiments of the present invention may utilize other methods for determining the location of an electronic device. For example, many cellular telephone systems are compliant with the E911 standards which seek to improve the quality of wireless 911 service. Phase 1 of the program requires carriers to report the location of the antenna receiving the wireless call. Phase 2 of the program requires carriers to provide much more exact location information (e.g., within 50-100 meters).

One solution for providing Phase 2 level compliance is a server aided location determining system as described in U.S. Pat. No. 6,131,067 titled Client-server Based Remote Locator Device by Richard Girerd and Norman Krasner, assigned to SnapTrack Inc. of San Jose, Calif., and which is incorporated by reference in its entirety herein. In this system, a remote device sends GPS data to a server which processes the data to derive the location of the remote device. The server then transmits the derived location to a client which can display the location of the remote device. In embodiments of Girerd, the remote device can send unprocessed position signals (e.g., GPS satellite signals) to the server which are then processed to derive the location of the remote device.

While the present embodiment is described with reference to GPS as comprising the geo-location determining and reporting system, it should be appreciated that an alternative embodiment may be practiced where the geo-location determining and reporting system is a system other than GPS. In such an embodiment, the geo-locating functionality is capable of accessing that system. In one embodiment, the geo-locating functionality comprises a GPS functionality capable of accessing one or more geo-location systems, in addition to its GPS access capability, such as the Galileo system.

Thus, embodiments of the present invention are well suited to enable an electronic device to determine its location and the time on a stand alone basis, or in conjunction with other so-called "aiding" systems. When the electronic device is outside of the coverage area of a wireless communications system, it can still determine its location and the time using embodiments of the present invention.

Exemplary Tracking System

Figure 2:
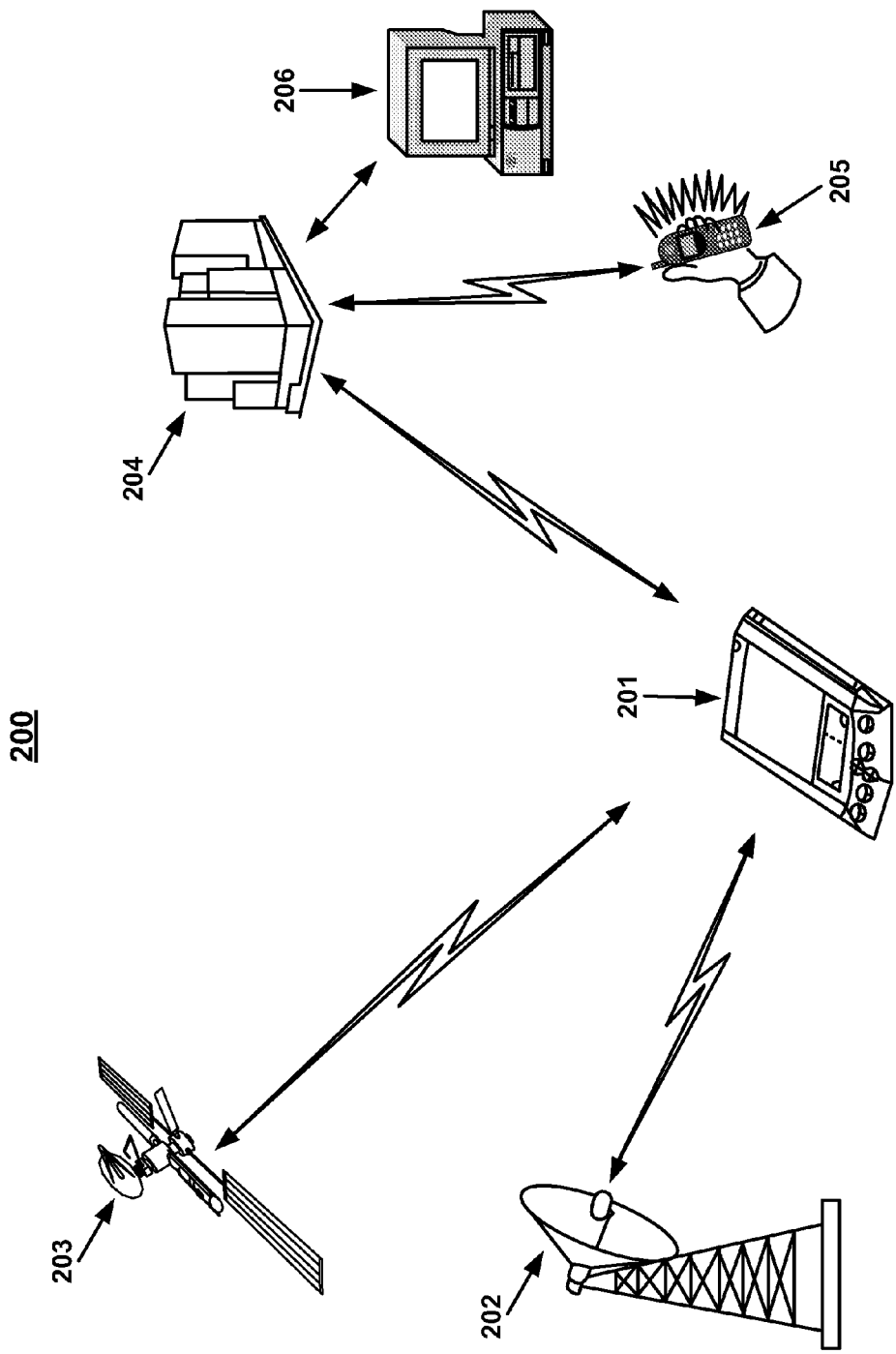
FIG. 2 depicts an exemplary position tracking system, according to an embodiment of the present invention.

FIG. 2 depicts an exemplary position tracking system 200, according to one embodiment of the present invention. System 200 comprises an electronic device 201 that is coupled with an initiating component 100 (FIG. 1), a position determining system (e.g., position determining system 202 or 203), and a position tracking service provider 204. In one embodiment, electronic device 201 comprises a portable device. In one embodiment, initiating component 100 is disposed within electronic device 201.

As depicted in FIG. 2, electronic device 201 is capable of wireless communications with service provider 204. When electronic device 201 is moved, initiating component 100 detects the movement and determines its geographic location using position determining system 202 or position determining system 203.

In accordance with embodiments of the present invention, position determining system 202 is a terrestrial-based position determining system. There are a variety of terrestrial-based position determining systems which can be utilized by embodiments of the present invention such as LORAN-C, Decca, radio beacons, etc. Furthermore, the present invention is well suited to utilize future implementations of terrestrial-based position determining systems.

In other embodiments of the present invention, initiating component 100 utilizes a satellite-based position determining system 203 to determine its position. There are a variety of satellite-based position determining systems which can be utilized by embodiments of the present invention such as the Global Positioning System (GPS), Differential GPS (DGPS), Eurofix DGPS, the Global Navigation Satellite System (GLONASS), etc. Furthermore, the present invention is well suited to utilize future implementations of satellite-based position determining systems.

As described above, embodiments of the present invention can determine the location of electronic device 201 and then compare the present location of electronic device 201 with a set of geographic coordinates of a pre-defined zone. Depending upon the relationship between the present location of electronic device 201 and the pre-defined zone, initiating component 100 may generate a command causing electronic device 201 to perform an action. For example, if electronic device 201 is moved from a specified zone without permission, a wireless message may be sent to position tracking service provider 204 as notification. Alternatively, initiating component 100 may cause electronic device 201 to emit an audible alarm until a user enters a security code (e.g., using input device 115; FIG. 1).

In one embodiment, in response to control with initiating component 100, electronic device 201 emits a wireless query message to access information relating to the local time corresponding to the current geo-location of the device. Thus, in one exemplary implementation, device 201 wirelessly queries a provider of information relating to the local time corresponding to that location when it is inactive (e.g., asleep, powered down, etc.) during movement from one geo-location to another, such as during travel. Yet the device remains responsive to reaching the destination geo-location.

While the embodiment of FIG. 2 recites using initiating component 100 in conjunction with a position tracking service provider (e.g., position tracking service provider 204; FIG. 2), the present invention is well suited to being used as a stand alone device. That is, initiating component 100 may be used to control an electronic device without interacting with position tracking service provider 204. For example, a user may simply desire to cause electronic device 201 to perform specific actions depending upon the geographic zone it is in, but not to report to position tracking service provider 204.

Exemplary Operating States

Figure 3:
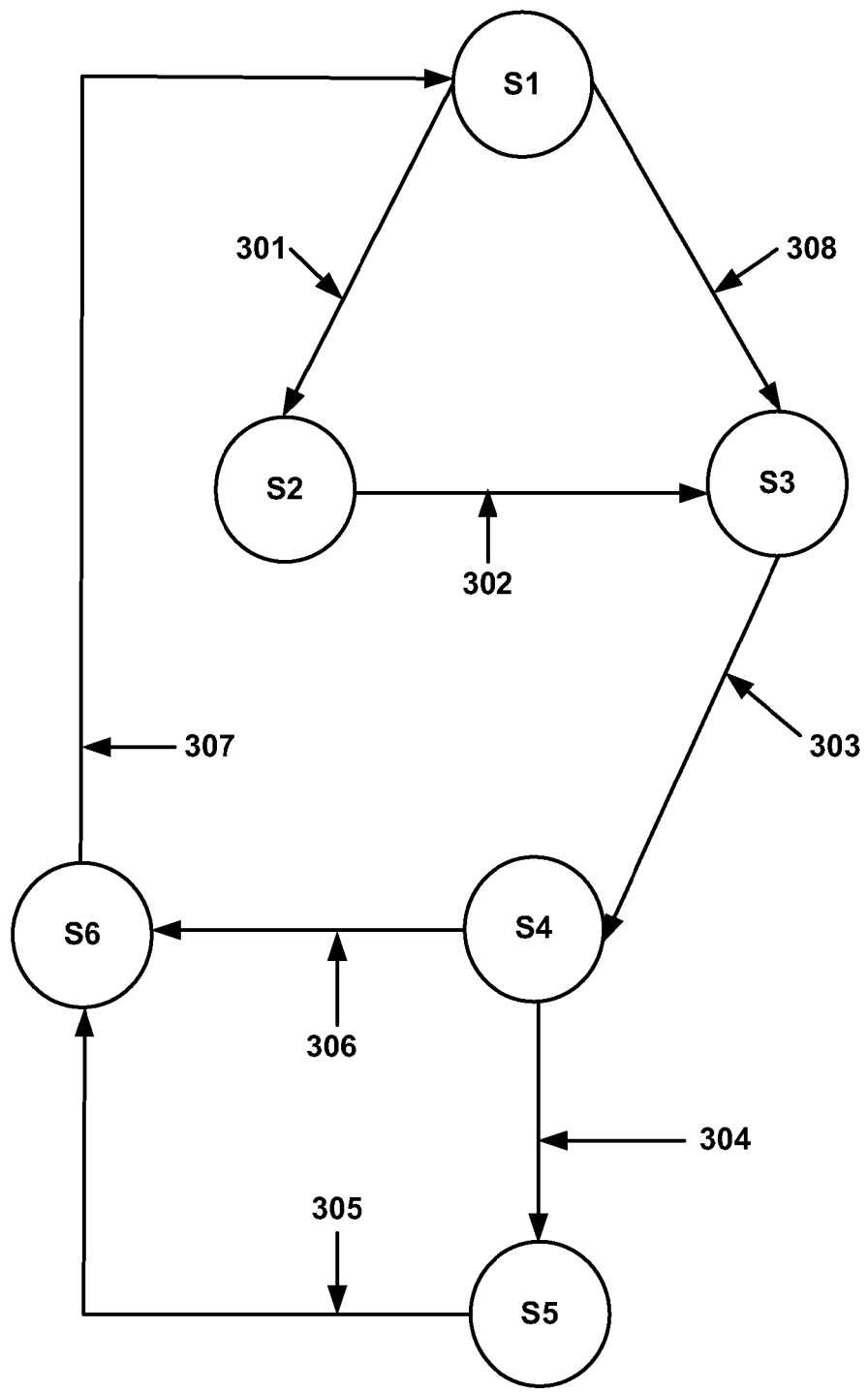
FIG. 3 depicts exemplary operating states of an initiating component utilized in accordance with an embodiment of the present invention.

FIG. 3 depicts exemplary operating states of an initiating component utilized in accordance with one embodiment of the present invention. For instance, the operating states depicted in FIG. 3 correspond, in one embodiment, to the operating states of initiating component 100 in accordance with embodiments of the present invention.

In operating state S1, initiating component 100 is in an idle operating state. In embodiments of the present invention, when initiating component 100 is in its idle state the only components drawing power are a real time clock of processor 101 and motion detector 106. This allows initiating component 100 to remain in an operating state in which a minimal amount of power is drawn from the electronic device (e.g., electronic device 201; FIG. 2) in which initiating component 100 is disposed. In embodiments of the present invention, as little as 10 μA are drawn while initiating component 100 is in idle operating state S1. Because battery drain is minimized in operating state S1, the battery replacement interval for electronic device 201 is thus extended. This is important for many portable electronic devices in which conserving battery life is a critical issue.

At event 301, motion detector 106 detects a change of the motion state of electronic device 201 and generates an interrupt to the controller of initiating component 100 (e.g., processor 101; FIG. 1). The change of motion state may be a starting or stopping of motion, or an acceleration or deceleration of initiating component 100. In response to the interrupt from motion detector 106, processor 101 causes initiating component 100 to transition to operating state S2. Operating state S2 is an active operating state of initiating component 100 in which initiating component 100 will attempt to attain a position fix of its current geographic location using position determining component 110.

When initiating component 100 successfully determines its position within a pre-determined time period, it automatically attempts to send a "fix" message to service provider 204 providing the current time and present geographic location of the device. Initiating component 100 will then continue to periodically determine its position and send that position information to service provider 204 while motion detector 106 detects that initiating component 100 is being moved. This allows service provider 204 to track initiating component 100, and thus the electronic device that initiating component 100 is monitoring, as it is being moved. The time period between position fixes is determined by the pre-determined time period of operating state S6.

The pre-determined time period for determining the present location of initiating component 100 can be a default setting, set by the user of initiating component 100, or set by service provider 204. If initiating component 100 cannot determine its position within the pre-determined time period, it will automatically initiate transmitting a "no-fix" message to position tracking service provider 204. The no-fix message conveys to service provider 204 that initiating component 100 has detected movement of electronic device 201 and that its position could not be determined using a position determining system (e.g., position determining system 202 or 203) within the pre-determined time period. However, in embodiments of the present invention, the position of initiating component 100 may be checked against the cellular ID sector information contained in the SMS no-fix message exchanged with service provider 204 while in operating state S4, or roughly triangulated using a plurality of cellular towers.

Time related information, e.g., a "time fix," relating to the operation of initiating component 100 can be accessed from the real time clock of processor 101, time related signals accessed with position determining component 110 and/or wireless communications component 107, etc., and/or with another input, such as from I/O 115.

In embodiments of the present invention, when initiating component 100 is in operating state S2, processor 101 and position determining component 110 are the only components drawing power. In embodiments of the present invention, current drain during operating state S2 is minimized while initiating component 100 is determining its location.

At event 302, initiating component 100 transitions to operating state S3. In accordance with embodiments of the present invention, initiating component 100 transitions to operating state S3 from operating state S2 after successfully determining its position. Alternatively, initiating component 100 automatically transitions to operating state S3 if a time period 308 expires before motion detector 106 detects movement. Time period 308 can be a default setting, a pre-determined parameter set by the user of initiating component 100, or set by service provider 204.

If initiating component 100 has successfully determined its location using position determining component 110, it then determines what action should be initiated based upon the current time and/or location in operating state S3. For example, a database may be accessed from storage device 105 that describes pre-determined actions to be taken based upon the current time and/or geographic location of initiating component 100. Thus, when electronic device 201 enters a zone defining an airport, the pre-determined action may be to generate a signal to invoke a shutdown routine for electronic device 201. When electronic device 201 leaves the zone defining the airport, initiating component 100 may generate a signal for starting electronic device 201 again.

Additionally, initiating component 100 may be configured to perform different actions depending upon what zone electronic device 201 is currently in. For example, if initiating component 100 is used to control a laptop computer, a user can configure the present invention so that a particular software application (e.g., a spreadsheet application) is initiated when the laptop is brought into the vicinity of the user's workplace and to initiate a different software application (e.g., a Web browser application) when the laptop is brought into the vicinity of the user's home.

As stated above, the action initiated by the present invention may also be determined by the current location in conjunction with the current time. Thus, the present invention may be configured to initiate one action when at a given location at a particular time and to initiate a second action at the same location but at a different time.

Returning now to FIG. 3, at operating state S3, processor 101 determines what action should be taken in response to the current time and/or current location of initiating component 100. Initiating component 100 then generates a command for controlling electronic device 201 based upon the current time and/or geographic location. Additionally, the real time clock of processor 101 may be updated using clock information obtained by position determining component 110 during operating state S2. Additionally, during operating state S3, the operating parameters of initiating component 100 may be checked. For example, the status of battery 117 may be checked to determine if a battery change will be necessary soon. Other parameters may include the length of time period 308, the time interval for successfully determining the present geographic location of initiating component 100 (e.g., during operating state S2), the current software version of initiating device 100, and/or the current version of the database of pre-designated geographic zones, etc.

At event 303, initiating component 100 transitions to operating state S4. In operating state S4, initiating component 100 attempts to transmit data to position tracking service provider 204. For example, initiating component 100 may attempt to transmit the current time and geographic location of electronic device 201 to position tracking service provider 204 using wireless communications component 107. Additional information that may be sent includes the type of change in the motion state of initiating component 100. For example, the message may indicate that movement of initiating component 100 has been initiated, or stopped. Alternatively, if a pre-determined time period expires before initiating component 100 successfully determines its position (e.g., during operating state S2), initiating component 100 will transmit a message to service provider 204 conveying that electronic device 201 has been moved but was not able to determine its position using position determining component 110.

Additionally, the fix and no-fix messages may contain additional information such as the battery condition and current operating parameters of electronic device 201. By sending the battery condition information, the present invention reduces the amount of maintenance a user needs to perform to keep electronic device 201 operating properly. For example, position tracking service provider 204 can send a message to the user reminding him to change the batteries in electronic device 201 when it has determined that the batteries are low. In one embodiment of the present invention, a text message can be sent to the user's cell phone 205, or an E-mail message can be sent to the user's home or office computer 206 reminding him to change the batteries in electronic device 201. Additionally, position tracking service provider 204 may determine whether an update of the database of pre-designated geographic zones should be sent to initiating component 100.

In embodiments of the present invention, when service provider 204 receives the position fix message from initiating component 100, it compares the data in the message with a set of pre-defined position parameters set by the user of electronic device 201. If the position of electronic device 201 is outside of the pre-defined position parameters, a message can be sent to the user and/or law enforcement agencies telling them that electronic device 201 has been moved outside of the authorized position parameters. Additionally, service provider 204 can provide the position of electronic device 201 to, for example law enforcement agencies, to assist in recovering the device. Additionally, service provider 204 can change the operating parameters of initiating component 100 during operating state S4 so that position fixes are sent more often in order to assist in recovering the asset which is being monitored. Service provider 204 may also send a command to electronic device 201 causing it to perform a given action. For example, service provider 204 can send a command to electronic device 201 causing it to become deactivated until it is recovered or until a security code is entered. Service provider 204 can also send a command to electronic device 201 causing it to sound an alarm until it is recovered or until a security code is entered.

As an example, when a user first subscribes to the position tracking services of service provider 204 he will be asked if he wants to utilize geo-fencing. The user will provide the geographic coordinates of pre-defined zones for electronic device 201 that specify an area or areas in which electronic device 201 is permitted to move without initiating a warning message to the user and the time periods which electronic device 201 is permitted to be in those areas. The user can also specify an action that is to be initiated by processor 101 if electronic device 201 enters or leaves one of the pre-defined zones. If, for example, electronic device 201 is moved outside of this position or area, service provider 204 contacts the user and/or law enforcement agencies and informs them that unauthorized movement of electronic device 201 has occurred. Service provider 204 may send a text message to the user's cellular telephone 205, an E-mail to the user's computer 206, etc. As described above, service provider 204 may send commands which change the operating parameters of initiating component 100 to cause it to send more frequent position reports when unauthorized movement of the asset is detected to assist in recovering electronic device 201.

Additionally, initiating component 100 can send operating status information during operating state S4. This allows service provider 204 to monitor the battery status of electronic device 201 and inform the user of electronic device 201 when the batteries need to be changed. For example, service provider can send an E-mail or other message to the user of electronic device 201 reminding him to change the batteries of the device when necessary. In embodiments of the present invention, only wireless communications component 107 draws power during operating state S4. In embodiments of the present invention, initiating component 100 functions to transmit its position in operating state S4 using minimal power.

At event 304, initiating component 100 transitions to operating state S5. While in operating state S5, initiating component 100 is in a query state and can receive commands and operating parameters from service provider 204. Additionally, at this time commands can be received for changing the operating parameters of initiating component 100. For example, the time period in which position determining component 110 is allowed to determine the position of initiating component 100 can be changed during operating state S5. Other parameters may include the database defining pre-designated geographic zones for initiating action and/or the action to be taken when entering or leaving one of the pre-designated geographic zones. While the present embodiment recites these parameters specifically, the present invention is well suited for receiving commands for a variety of actions while in operating state S5. In one embodiment, while initiating component 100 is in operating state S5, only wireless communications component 107 draws power. Again, this reduces the amount of power drawn from electronic device 201 and extends the battery life of the device. In embodiments of the present invention, initiating component 100 functions to draw minimal power while in operating state S5.

At event 305, when communications with position tracking service provider 204 have completed, initiating component 100 transitions to operating state S6. Alternatively, at event 306, initiating component 100 transitions to operating state S6 if a pre-designated time interval elapses in which initiating component 100 was unable to successfully transmit data during operating state S4.

Operating state S6 is a delay state in which initiating component 100 is forced to remain idle for a pre-determined time period. This sets a time interval between successive position fixes and prevents initiating component 100 from drawing excessive battery power from electronic device 201 in attempting to constantly determine its position while it is being moved. In embodiments of the present invention, initiating component 100 draws as little as 10 µA of power while in operating state S5. The pre-determined time period is an operating parameter which can be a default setting, set by the user of initiating component 100, or by service provider 204 during operating state S5.

The length of the pre-determined time period of operating state S6 can be changed during the query operating state (e.g., operating state S5) as a result of receiving operating parameters from service provider 204. In one embodiment, if service provider 204 determines that unauthorized movement of initiating component 100 is occurring, the length of the time period of operating state S6 can be changed during operating state S5 to cause initiating component 100 to continuously or more frequently send its position to service provider 204. This facilitates locating and recovering the device in which initiating component 100 is disposed. After the pre-determined time period of operating state S6 has expired, initiating component 100 again enters operating state S1 at event 307 at which point initiating component 100 can repeat the process if motion detector 106 detects that electronic device 201 is being moved.

Figure 4:
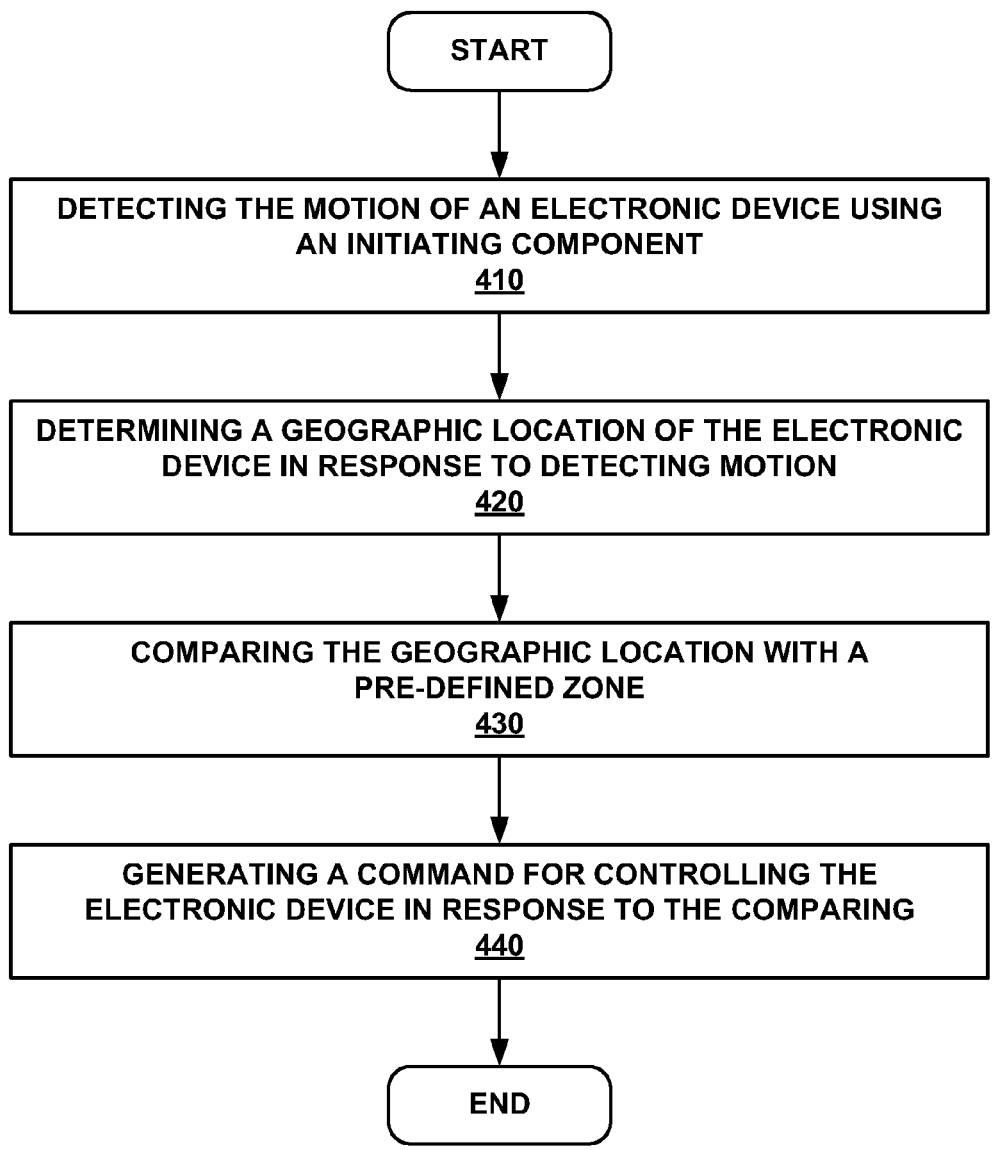
FIG. 4 is a flowchart of an exemplary method for controlling a device an embodiment of the present invention.

FIG. 4 is a flowchart of a method for reducing power consumption in a portable position reporting device in accordance with embodiments of the present invention. In step 410, the motion of an electronic device (e.g., electronic device 201; FIG. 2) is detected using an initiating component (e.g., initiating component 100; FIG. 1) that is disposed within the electronic device. According to embodiments of the present invention, a motion detecting component (e.g., motion detector 106; FIG. 1) is coupled with a controller (e.g., processor 101; FIG. 1). Motion detector 106 is for detecting changes in the state of motion of initiating component 100. For example, motion detector 106 can detect when initiating component 100 transitions from an idle state to a substantially moving state and/or changes in the rate of movement of initiating component 100. Thus, in embodiments of the present invention, motion detector 106 detects changes in the state of motion of initiating component 100 such as starting or stopping of motion, as well as acceleration/deceleration.

Coupling a motion detecting component which detects motion with initiating component 100 is a novel method of reducing power consumption for electronic device 201 because it allows initiating component 100 to monitor the location of electronic device 201 while drawing a minimal amount of power when movement has not occurred. In embodiments of the present invention, while initiating component 100 is in an idle operating state, only a real time clock of controller 101 and motion detector 106 are drawing power. Initiating component 100 does not attempt to determine its geographic location unless motion detector 106 detects a change in the motion state of electronic device 201. Thus, the number of position fixes to monitor the location of electronic device 201 are minimized and power consumption is reduced.

In step 420, the geographic location of the electronic device is determined in response to detecting its motion. In one embodiment, motion detector 106 detects the vibration associated with the movement of the electronic device in which initiating component 100 is disposed and indicates this movement to processor 101 when changes in motion are detected. In embodiments of the present invention, processor 101 automatically causes a position determining component (e.g., position determining component 110; FIG. 1) to determine the geographic location of electronic device 201 in response to receiving an interrupt from motion detector 106. In embodiments of the present invention, a terrestrial based or satellite based position determining system may be utilized to determine the geographic location of electronic device 201. Additionally, the processing of data to determine the geographic location of electronic device 201 may be performed by processor 101 or in conjunction with a remotely located server (e.g., service provider 204; FIG. 2).

In step 430, the geographic location determined in step 420 is compared with a pre-defined zone. In embodiments of the present invention, the present location of electronic device 201 are compared with geographic coordinates that define a zone. These coordinates can be stored in a memory (e.g., storage device 105; FIG. 1) coupled with processor 101 or stored remotely (e.g., at service provider 204; FIG. 2).

In step 440, a command for controlling the electronic device is generated in response to the comparing. In embodiments of the present invention, depending upon the relationship between the current geographic location of electronic device 201 (e.g., as determined in step 420 above) and the geographic coordinates that define a particular zone, a command is generated (e.g., with processor 101; FIG. 1) for controlling electronic device 201. Additionally, different commands can be generated depending upon the relationship between the current location of the electronic device and a particular pre-defined zone. For example, when electronic device 201 is within a given pre-defined zone, a first command is generated for controlling electronic device 201. When electronic device 201 is moved outside of that pre-defined zone, a different command for controlling electronic device 201 is used.

Exemplary State Machine

In one embodiment, initiating component 100 functions (e.g., is operated as, etc.) a state machine, which is persistent over power cycles, such as those discussed above with reference to FIG. 3, for example. Such persistence allows initiating component 100, upon "waking" from a programmed sleep period, for instance, to know (e.g., be aware of, etc.) its current state, and thus take a step (e.g., action, etc.) appropriate for performance upon such waking, etc.

Figure 5:
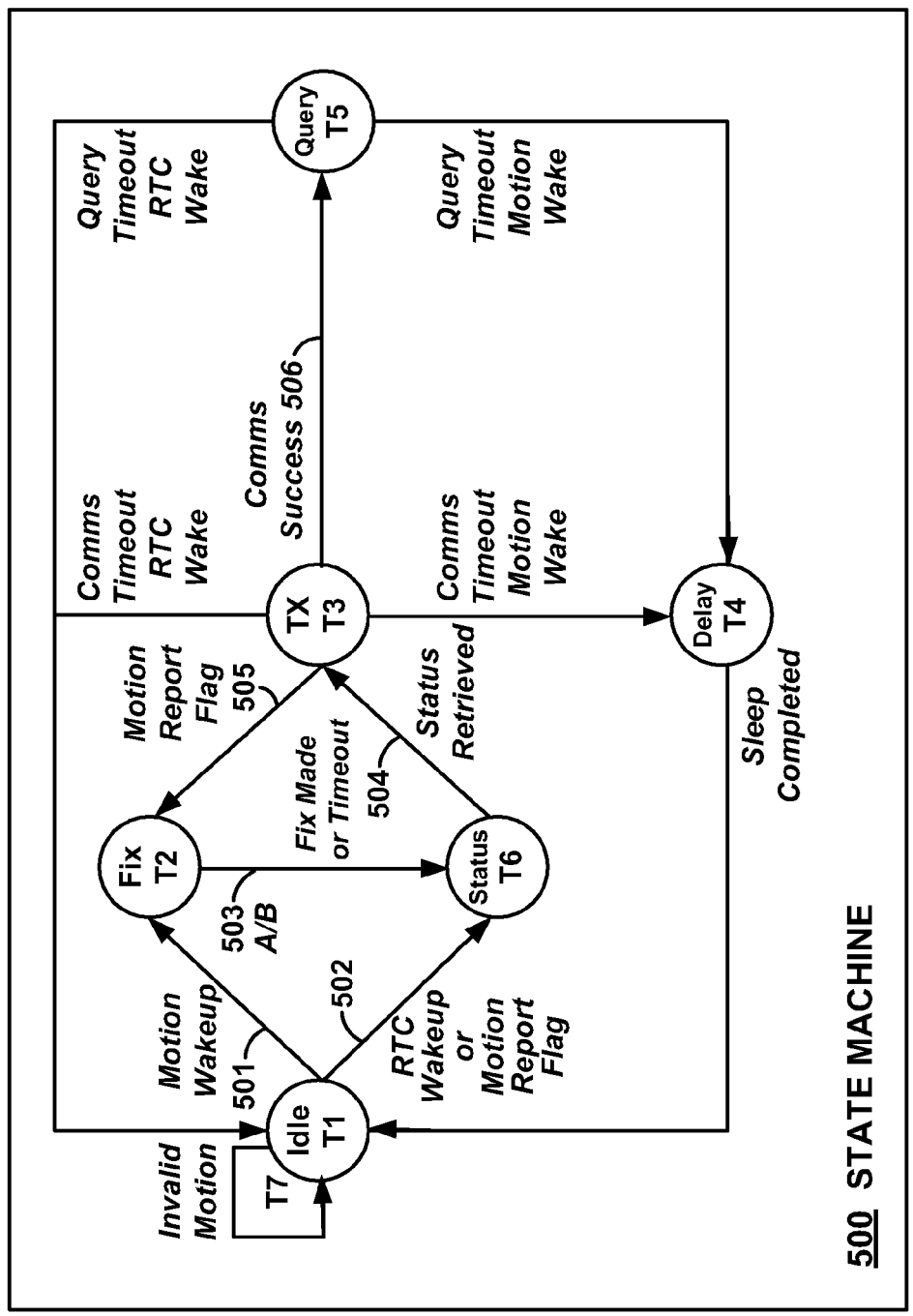
FIG. 5 depicts an exemplary state machine, according to an embodiment of the present invention.

FIG. 5 depicts an exemplary state machine 500, according to an embodiment of the present invention. Initiating component 100 implements state machine 500 with mechanisms similar to those discussed above with reference to FIG. 3. State machine 500 can typically spend most of its time in an 'idle' state T1.

Detection of persistent motion, e.g., with motion detector 106, sets motion flag T7 as true. Persistent motion is motion that persists for more than a preset period, and can be inferred to correspond to purposeful motion towards a destination or along a route, etc. Motion that does not persist longer than the preset time results in setting motion flag T7 as false. Where motion flag T7 is false, state machine 500 makes a 'motion wakeup' transition 501 to a 'fix' state T2. Where motion flag T7 is true, state machine 500 makes a 'motion report' transition 502 to a 'status' state T6. State machine 500 can also transition to status state T6 upon a time related event such as a wakeup after a predetermined period corresponding to idle state T1, as determined for instance by a real time clock corresponding to time sensitive element 199.

During fix state T2, initiating component 100 functions, for a pre-determinable period of time, to fix its position and in one embodiment to ascertain (e.g., update) the current time. Where a fix, e.g., geographic/temporal, is achieved, state machine 500 makes a 'new fix available' transition 503A to status state T6. Where no fix is achieved within the time period allotted, state machine 500 makes a 'no new fix' transition 503B to status state T6.

During status state T6, initiating component 100 retrieves and stores the latest status information, including the new fix, if one is available. Upon retrieval, state machine 500 makes a 'status message' and transition 504 to a transmit state T3. Status information included in such a status report can include battery condition, battery change events, etc. In one embodiment, battery management functions, such as battery change events and battery voltage readings, are handled in the status state T6.

In transmit state T3, initiating component 100 functions to attempt to transmit associated position and status information, e.g., to a server such as service provider 204 (FIG. 2). In one embodiment, the latest status information is combined with position information, e.g., with a new application protocol message. Where motion report flag T7 was true, state machine makes a corresponding motion report message transition 505 back to fix state T2.

Where the message is not a motion report message, state machine 500 does not immediately transition to fix state T2. Instead, where transmission is successful, state machine 500 makes a communications successful message 506 to 'query' state T5. Where the transmission is unsuccessful for a pre-determinable (e.g., programmable) period of time, state machine 500 transitions to delay state T4 or, where the wakeup type corresponds to a real time clock wakeup, to idle state T1.

In the query state T5, initiating component 100 waits to receive a request from the server for a pre-determinable time period. Where requests are received, they are processed in order, with responses sent if requested. After the time period expires, state machine 500 transitions to delay state T4 or, where the wakeup type corresponds to a real time clock wakeup, to idle state T1.

In the delay state T4, initiating component 100 disables wakeups generated by motion detector 106 and sleeps for a programmed period. After the programmed sleep time expires, initiating component 100 transitions to idle state T1. In so doing, motion detector 106 is re-enabled. Initiating component 100 then goes back to sleep.

Exemplary Time & Position Based Control

Initiating component 100 allows control of an electronic device (e.g., in which it is disposed) based on its location relative to a geographic zone, as described above. In one embodiment, initiating component 100 further allows control of the electronic device based on the device being within a geo-temporal zone, which is defined on the basis of geographic location or a combination of geography and time.

In one such embodiment, time sensitive element 199 and processor 101 function with position determining component 110 and/or wireless communications component 107 to allow initiating component 100 to control a device to perform a particular task upon entering or leaving the geo-temporal zone. For instance, in the present embodiment, initiating component 100 allows the device to enable (e.g., to become enabled) within a pre-selectable (e.g., programmable) window of time and/or disables the device within such a window.

Exemplary Processes

Figure 6:
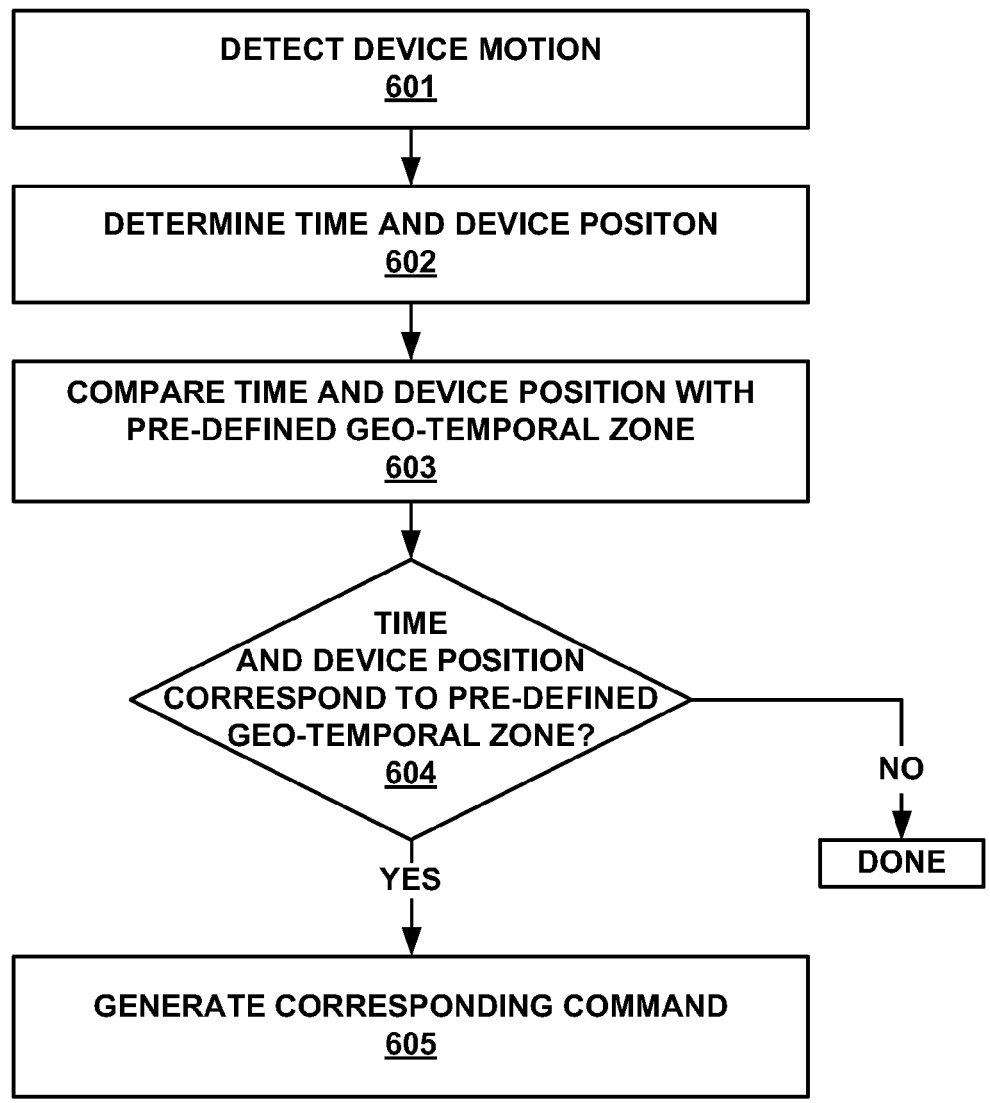
FIG. 6 is a flowchart of an exemplary method for controlling an electronic device, according to embodiments of the present invention.

FIG. 6 is a flowchart of an exemplary process 600 for controlling an electronic device, according to an embodiment of the present invention. Process 600 begins with step 601, wherein device motion is detected.

In step 602, the time corresponding to the motion detection and the present geographic location of the device is determined. In step 603, the time and device position is compared with a pre-defined geo-temporal zone. In step 604, it is determined whether the time and device position corresponds to the pre-defined geo-temporal space. If not, process 600 can be completed.

Where it is determined that the time and device position corresponds to the pre-defined geo-temporal space, in step 605, a control command is generated for the device, which corresponds to the presence of the device within the geo-temporal zone, completing process 600.

Figure 7:
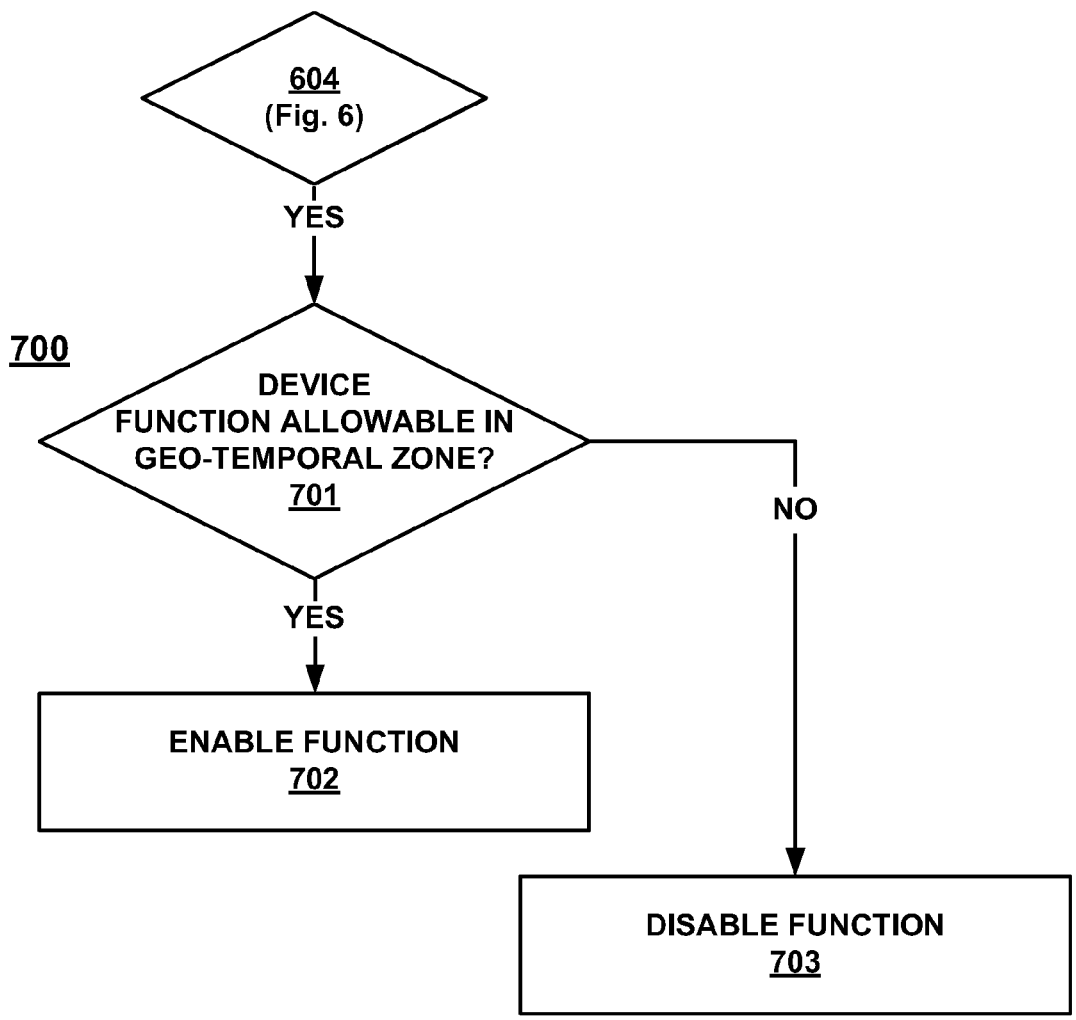
FIG. 7 is a flowchart of another exemplary method for controlling an electronic device, according to embodiments of the present invention.

FIG. 7 is a flowchart of an exemplary process 700, e.g., corresponding to step 605 (FIG. 6), for generating an appropriate control command for an electronic device, according to an embodiment of the present invention. Process 700 begins with step 701 wherein, upon determining that the time and device position corresponds to the pre-defined geo-temporal space (e.g., step 604; FIG. 6), it is determined whether a function of the device is appropriate for (e.g., allowable in) the geo-temporal zone. If so, in step 702, the device function is enabled. If not, in step 703, the device function is disabled.

Figure 8:
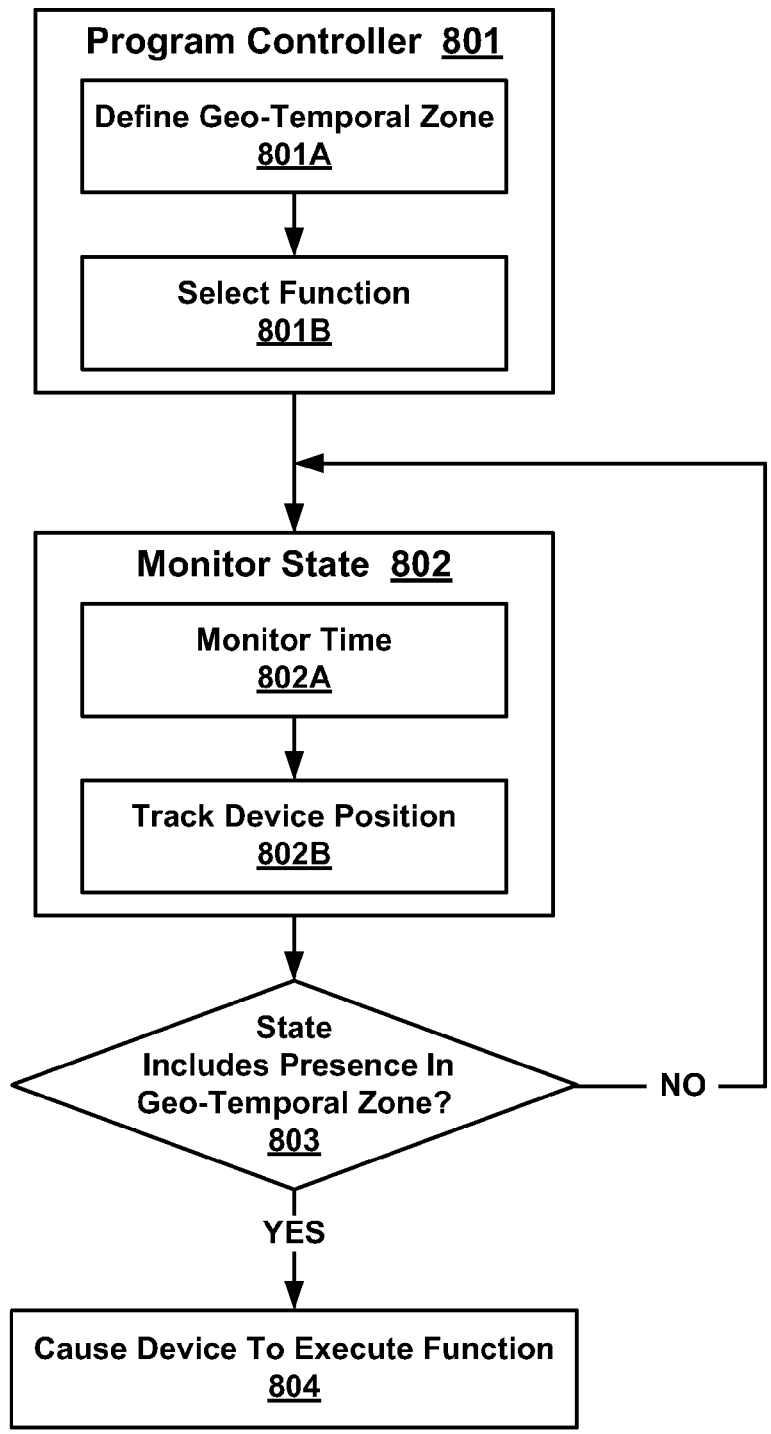
FIG. 8 is a flowchart of yet another an exemplary process for controlling an electronic device, according to an embodiment of the present invention.

FIG. 8 is a flowchart of an exemplary process 800 for controlling an electronic device, according to an embodiment of the present invention. Process 800 begins with step 801, wherein the controller of a portable electronic device is programmed.

In one embodiment, step 801 comprises steps 801A and 801B. In step 801A, a geo-temporal zone, corresponding to a certain real time and a particular geographic location, position, boundary, etc., is defined. In step 801B, a function correspondingly appropriate for the defined geo-temporal zone is selected.

In step 802, a state corresponding to the device is monitored. In one embodiment, step 802 comprises steps 802A and 802B. In step 802A, real time is monitored by the controller, the device, etc. In step 802B, the position (e.g., geographic, location-based, etc.) of the device is monitored, such as with tracking.

In step 803, it is determined whether the device state includes the presence of the device within the defined geo-temporal zone. If not, process 800 loops back to step 802 and continues monitoring the state of the device. Where it is determined that the device state includes the device being present within the defined geo-temporal zone, then in step 804, action is taken to cause the device to execute the selected function (e.g., the function selected in step 801B), completing process 800.

In summary, a method for controlling an electronic device is disclosed wherein an electronic device is programmed to define a geo-temporal zone according to a location and/or a window of time with the location, and to select a device function for that zone. A device state, which includes the current time and the device position is then monitored. Upon determining that the device state corresponds with the defined geo-temporal zone, the device is controlled to execute the selected function. The function can relate to selectively enabling or disabling some or all of the device capabilities, power management, and others.

Embodiments of the present invention, a method and system for controlling an electronic device, are thus described. While the present invention has been described in particular embodiments, it should be appreciated that the present invention should not be construed as limited by such embodiments, but rather construed according to the following claims.

What is claimed is:

1. A method for controlling an electronic device, comprising:
   detecting motion of said electronic device using an initiating component disposed within said electronic device, said initiating component comprising:
      a controller;
      a position determining component coupled with said controller;
      a motion detecting component coupled with said controller; and
      a time sensing component coupled with said controller;
   determining the current time and a geographic location of said electronic device in response to said detecting motion;
   comparing said current time and said geographic location with a pre-defined zone corresponding to time and space; and
   generating a command for controlling said electronic device in response to said comparing.

2. The method as recited in claim 1, wherein said determining said current time comprises one or more of:
   accessing a time signal generated with a real time clock comprising said time sensing component;
   accessing a time signal promulgated by a time reporting entity; and
   updating said real time clock based on said time signal promulgated by a time reporting entity wherein said time reporting entity comprises a time standard.

3. The method as recited in claim 1, wherein said determining a geographic location comprises accessing a signal generated with one or more of a satellite-based position determining system and a terrestrial-base position determining system.

4. The method as recited in claim 1, further comprising said motion detecting component generating a signal in response to said detecting motion of said electronic device.

5. The method as recited in claim 4, wherein said determining a geographic location comprises said controller causing said position determining component to determine said geographic location in response to said signal.

6. The method as recited in claim 1, further comprising sending a message using a wireless communications component coupled with said controller.

7. The method as recited in claim 6, wherein said controller automatically causes said wireless communications component to transmit said message when said geographic location is determined within a pre-determined time parameter.

8. The method as recited in claim 6, wherein said controller causes said wireless communications component to transmit a second message when said position determining component cannot determine said geographic location within said pre-determined time parameter.

9. The method as recited in claim 6, wherein said controller automatically causes said wireless communications component to transmit a third message when said motion detecting component does not detect movement of said electronic device within said pre-determined time parameter.

10. The method as recited in claim 6, wherein said sending a message comprises conveying said geographic location using said wireless communications component.

11. The method as recited in claim 1 wherein, in response to said command, a function associated with said electronic device is selectively enabled and disabled on the basis of one or more of said current time and said geographic location.

12. A time and position tracking system comprising:
   a position tracking service provider; and
   an electronic device coupleable with said position tracking service provider, said electronic device comprising an initiating component for controlling said electronic device on the basis of one or more of time and location, wherein said initiating component comprises:
      a controller;
      a motion detecting component coupled with said controller, for detecting movement associated with said electronic device;
      a time sensing component coupled with said controller for determining a current time; and
      a position determining component coupled with said controller for determining a geographic location corresponding to said electronic device, wherein a function associated with said electronic device is selectively enabled and disabled on the basis of one or more of said current time and said geographic location.

13. The time and position tracking system as recited in claim 12, wherein said motion detecting component generates an interrupt signal to said controller in response to detecting movement of said electronic device.

14. The time and position tracking system as recited in claim 13, wherein, responsive to said interrupt signal, said controller determines said current time and said geographic location.

15. The time and position tracking system as recited in claim 14, wherein said position determining component accesses a signal generated by said position tracking service provider to determine said geographic location.

16. The time and position tracking system as recited in claim 15, wherein said position tracking service provider comprises one or more of a satellite-based position determining system and a terrestrial-based position determining system.

17. The time and position tracking system as recited in claim 12, wherein said controller compares one or more of said geographic location, and said time and said geographic location, with a pre-defined geo-temporal zone.

18. The time and position tracking system as recited in claim 17, wherein said controller generates a command for controlling said electronic device in response to said comparing.

19. The time and position tracking system as recited in claim 12, wherein said time sensing component comprises a real time clock.

20. The time and position tracking system as recited in claim 19, wherein said determining said current time comprises one or more of:

accessing a time signal generated with said real time clock;
accessing a time signal promulgated by a time reporting entity; and
updating said real time clock based on said time signal promulgated by a time reporting entity wherein said time reporting entity comprises a time standard.

21. The time and position tracking system as recited in claim 20 wherein said time reporting entity comprises one or more of a time standard, said position tracking service provider, and a communication network coupled with said electronic device.

22. The time and position tracking system as recited in claim 12, further comprising a wireless communications component coupled with said controller.

23. The time and position tracking system as recited in claim 22, wherein said controller automatically causes said wireless communications component to transmit a message conveying said geographic location to said position tracking service provider when said geographic location is determined within a pre-determined time parameter.

24. The time and position tracking system as recited in claim 23, wherein said controller automatically causes said position determining component to transition to an idle operating state for a pre-determined time period after transmitting said message.

25. The time and position tracking system as recited in claim 24, wherein said controller automatically causes said wireless communications component to transmit a second message to said position tracking service provider when said geographic location is not determined within said pre-determined time period.

26. The time and position tracking system as recited in claim 24, wherein said controller automatically causes said wireless communications component to transmit a second message to said position tracking service provider when said geographic location cannot be determined within said pre-determined time period.

27. The time and position tracking system as recited in claim 24, wherein said controller automatically causes said wireless communications component to transmit a third message to said position tracking service provider when said initiating component has not detected movement of said position determining component within a pre-determined time parameter. and a communication network coupled with said electronic device.

28. The time and position tracking system as recited in claim 12, wherein said initiating component is disposed within said electronic device.

29. A method for controlling a portable electronic device, comprising:
programming a controller of said portable electronic device, wherein said programming comprises:
defining a geo-temporal zone according to one or more of:
a location corresponding to a selected geographic position; and
a window of time and said location; and
selecting a function for said portable electronic device corresponding to said geo-temporal zone;
monitoring a state of said portable electronic device wherein said state comprises:
a current time; and
a present geographic position of said portable electronic device; and
upon determining that said state corresponds with said defined geo-temporal zone, causing said portable electronic device to execute said function.

30. The method as recited in claim 29 wherein said function comprises selectively enabling and disabling an operation relating to said portable electronic device.

31. The method as recited in claim 29 wherein said function comprises managing an operation of said portable electronic device related to its power source.

32. The method as recited in claim 29, wherein said controller is disposed within said portable electronic device.

33. The method as recited in claim 32 wherein said controller comprises one or more of:
a time sensing component;
a data storage component;
a wireless communications component; and
a position determining component.

34. The method as recited in claim 33 wherein said controller is wirelessly coupleable with one or more of:
a time reporting entity; and
a position determining system.

35. The method as recited in claim 34, wherein said position determining system comprises one or more of a satellite-based position determining system and a terrestrial-based position determining system.

36. The method as recited in claim 34 wherein said current time is determined with reference to one or more of:
a real time clock associated with said controller;
and a time reporting entity.

37. The method as recited in claim 36 wherein said time reporting entity comprises one or more of:
a time standard;
said position determining system; and
a communications network coupled with said electronic device, and wherein said real time clock is updated with a signal accessed from said time reporting entity.

38. An initiating component for controlling an electronic device, comprising:
a controller;
a time sensing component coupled with said controller for monitoring time;
a motion detecting component coupled with said controller for generating a motion signal when movement of said electronic device is detected;
a position determining component coupled with said controller and for determining a geographic location of said electronic device, wherein said controller automatically causes said position determining component to determine said geographic location in response to said motion signal; and
wherein said controller compares one or more of a current time, and said current time and said geographic location with a pre-defined geo-temporal zone and generates a command for controlling said electronic device in response to said comparing.

39. The initiating component as recited in claim 38, wherein said command comprises one or more of: selectively enabling and disabling a function associated with said electronic device; and managing a power function related to said electronic device.

40. The initiating component as recited in claim 38, further comprising a wireless communications component coupled with said controller.

41. The initiating component as recited in claim 40, wherein said controller automatically causes said wireless communications component to transmit a message when said geographic location is determined within a pre-determined time parameter.

42. The initiating component as recited in claim 41, wherein said controller causes said motion detecting component to transition to an idle operating state for a pre-determined time period after transmitting said message.

43. The initiating component as recited in claim 40, wherein said controller causes said wireless communications component to transmit a second message when said position determining component cannot determine said geographic location within said pre-determined time parameter.

44. The initiating component as recited in claim 40, wherein said controller automatically causes said wireless communications component to transmit a third message when said motion detecting component does not detect movement of said electronic device within a pre-determined time parameter.

45. The initiating component as recited in claim 38, wherein said motion detecting component comprises one or more of a magneto-resistive motion detector, an acceleration sensor, a tilt sensor, a vibration sensor, a rotation sensor, a gyroscope, an interferometer, and a motion sensor.

* * * * *

UNITED STATES PATENT AND TRADEMARK OFFICE
CERTIFICATE OF CORRECTION

| | | |
|---|---|---|
| PATENT NO. | : 7,453,355 B2 | |
| APPLICATION NO. | : 11/176854 | |
| DATED | : November 18, 2008 | |
| INVENTOR(S) | : Greg Janky, Dennis Workman and Ami Bergstrom | |

It is certified that error appears in the above-identified patent and that said Letters Patent is hereby corrected as shown below:

Col. 21, Line 45,
At the end of Claim 27 there is an extra phrase after the period. Claim 27 should read:

"The time and position tracking system as recited in claim 24, wherein said controller automatically causes said wireless communications component to transmit a third message to said position tracking service provider when said initiating component has not detected movement of said position determining component within a pre-determined time parameter."

Signed and Sealed this

Sixth Day of January, 2009

JON W. DUDAS
*Director of the United States Patent and Trademark Office*